Figure 1:
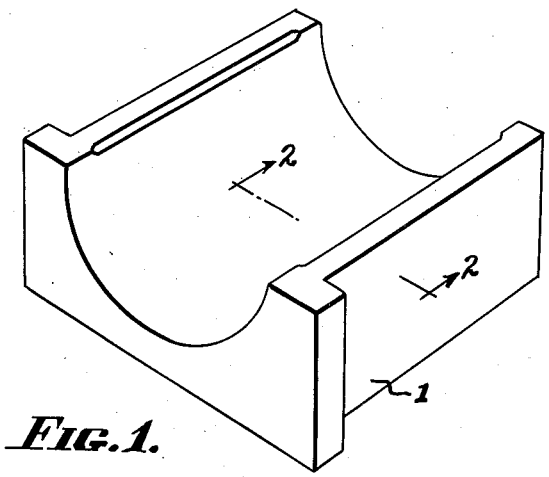

Feb. 25, 1941.  L. T. FREDERICK  2,233,206
BEARING MATERIAL
Filed July 30, 1936

INVENTOR.
Louis T. Frederick.
BY Allen & Allen
ATTORNEYS.

Patented Feb. 25, 1941

2,233,206

UNITED STATES PATENT OFFICE 2,233,206

BEARING MATERIAL

Louis T. Frederick, Oak Park, Ill., assignor to The Richardson Company, Lockland, Ohio, a corporation of Ohio Application July 30, 1936, Serial No. 93,449

1 Claim. (Cl. 154—52)

This is a continuation in part of my copending case Ser. No. 22,802, filed May 22, 1935, and entitled Bearing and bearing material.

My invention relates to bearings and bearing material made of or comprising condensation resins, and while not so limited, is of particular importance in connection with bearings for heavy duty, i. e. bearings which must resist great pressures. It has hitherto been proposed to manufacture bearings of woven fabrics, or other saturable materials dipped into incompletely polymerized synthetic resins and assembled and pressed and cured in a desired form. Successful bearings of this type have been made. It has also long been recognized that it would be highly desirable to include in the bearing body some lubricant. Graphite has been suggested as a suitable lubricant, but a number of difficulties have arisen in connection with its use. No attempts, so far as I am aware, have been made to use anything but flake graphite, or flake graphite compositions. In some of the prior suggestions, the various laminae making up the bearing have been perforated so as to permit graphite to pass through. In other prior suggestions, flake graphite has been mixed with the resin varnish, and the textile or other materials dipped therein. The difficulty with this is that the graphite tends to segregate between the laminations. A higher concentration of graphite between the laminations greatly reduced the tensile strength of the finished product, and while this is more important in the manufacture of Bakelite gears, or the like, yet even in the manufacture of bearings the matter of strength is vital. Consequently, in the manufacture both of bearings and gears in the past it has been necessarily strictly to limit the amount of graphite which could be used to, say, 5% or under. Moreover, as such a bearing wears, if the wear is along the face of a lamination, the lubricating substance concentrated at that face will eventually be worn away and dissipated, whereupon there is no lubricant effective in the bearing until the lamina of cloth or other substance is worn away, and the next concentrated layer of lubricant exposed. If the wear is across the laminae, a more even condition is attained; but the lubricant is concentrated in some areas and is absent in other areas, thus bringing about an undesirable condition.

For lubricating purposes the so called "flake graphite" has been preferred, not only because it was generally softer and had a better lubricating quality than the amorphous and harder type, but also because, as its name implies, it existed in the form of relatively broad, flat flakes. These flakes tend to line up and were therefore thought to provide a better lubricating surface. These effects are however, disadvantageous in condensation resin bearings. When mixed with the liquid resin, the flakes tend especially to line up in laminations much like a so called bronze powder does in a bronzing liquid when the liquid is spread in thin layers, and to migrate to the surface. This has been referred to as the "leafing effect". Clearly this tends to weaken any moulded product made from such a mixture. Again the lining up of the graphite flakes, where considerable graphite is used, tends to give a moulded substance which is electrically conductive; and in many uses this is undesirable. Finally the flakes, by reason of their size are unable to penetrate any fabric or other laminae in the product, other than superficially; and the moulded article is not homogeneous.

In the practice of my invention, I have found that I can secure a bearing structure which not only is substantially homogeneous as regards the distribution of lubricant, but is also not limited as hitherto in the amount of lubricant which may be employed, and which is a much stronger article than has hitherto been made with an equivalent amount of lubricating substance.

I have found that certain singular advantages arise from the use of graphite materials which are so fine in subdivision as to form with a suitable resin a mixture which is substantially stable and non settling, and will for this reason hereinafter be referred to as a colloidal mixture, although it is not to be understood that the mixture has all of the qualities generally to be found in colloids or emulsion. With graphites of such subdivision, however, a mixture is obtained which will completely and homogeneously saturate hard woven fabrics, giving a resultant product which is homogeneous from the standpoint of lubricant distribution, and which therefore has a constant rather than a variable lubricating quality. Agitation does not have to be employed in the saturating step. There is no tendency for the graphite to stratify in the resultant product, and the product, for equivalent weights of graphite is much stronger than any heretofore produced. Also, the graphite is so incorporated with the resin that each particle is coated thereby, and not only does the resultant product have a high dielectric strength, but also is substantially insulative in character for this reason. It is not possible to see with the naked eye flakes of graphite in my product. The moulded bearing has a surface appearance similar to that of black moulded condensation resin without graphite, and upon rubbing the surface with a clean cloth, the graphite does not come away on the cloth because the particles are bonded in the resinous matrix. Yet the bearing has a high self lubricating quality due to the large amount of graphite it contains, and further due to the fact that this graphite remains in place.

I am not limited to the kind of graphite which I may employ. Both the amorphous and the so called flake or floccular graphites may be used, providing the particle size is fine enough; the particle shape, as distinguished from the particle size, is not a matter of importance.

I prefer for their superior qualities the graphites which are mined in Ceylon, but my invention is not so limited. A suitable grade of graphite is chosen and is ground exceedingly finely, the finer the better, and the coarser particles are separated out, preferably during a process of air floatation, although fine screening is also effective. Other methods of subdividing graphite may of course be employed such as the "micronizing" methods recently developed. It is my purpose to provide, as a saturation material, a mixture of graphite and the incompletely polymerized resin in such a condition that the saturation of a fabric may be carried on without essential filtering of the graphite out of the liquid vehicle. As a consequence, I employ a graphite so fine that it will pass into the interstices of a fabric along with the resin, and will penetrate with the resin substantially all pores in the fabric, or the component threads thereof. I have found suitable for this purpose a graphite substantially all of which will pass through a screen of 325 meshes to the inch. This gives a particle size of about 40 microns. Recently graphitic materials have been produced having an average particle size of 2 microns. Any of these materials give, when mixed with a suitable resinous vehicle, a non-settling mixture which I have referred to as "colloidal". Any such mixture, after formation, may be run into the ordinary saturating pan, and laminae for moulding passed through the pan in the ordinary way for condensation resins without graphite. No agitation is necessary. Where the graphitic material is known to contain some particles too large to come into the condition of "colloidal mixture" agitation is disadvantageous because if there is no agitation the heavier particles can settle out, giving a saturating mixture wholly of the colloidal character. Where the particles are all of uniform and "colloidal" fineness, it makes little difference whether agitation be employed or not. In this way I am enabled to achieve a bearing throughout the body of which the distribution of lubricant is substantially uniform and homogeneous.

In the manufacture of my bearings, I take a fabric, such as canvas or duck (and in many instances a finer fabric may be employed to advantage) and saturate it with the mixture of incompletely polymerized resin and graphite. Ordinarily it is sufficient to take graphite of the fineness to which I have referred, and merely mix it with the liquid, resinous vehicle. It is possible, however, to mill or grind the graphite in the presence of the vehicle if desired. Preferably a resin of the harder type is used.

In ordinary practice, I use a hard resin which nevertheless, in the incompletely polymerized state, is thinly liquid enough to form a good saturant. The character of the resin can, of course, be modified as desired. I form a suitable resin, and bring it to a liquid condition in the incompletely polymerized state, generally with the aid of a solvent, and then merely stir in the graphite material. This may be done by hand in a suitable vessel, or may be done in a kettle equipped with a mechanical agitator. The graphite, if it is of the proper fineness, very readily assumes the condition of "colloidal" mixture, without either a tendency to settle out or a tendency to float to the surface. After formation of the mixture, it is run into the ordinary saturating pans, and the fabric or other material for the laminations passed through it in the ordinary way.

Figure 2:
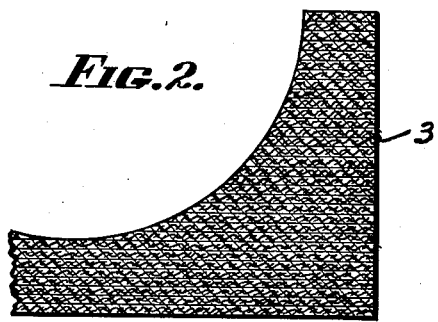

The laminated sheets of fabric or portions of them are assembled and cured under heat and pressure, as in the ordinary practice. I have illustrated in Figure 1, at 1, an exemplary form of a bearing such as is suitable for the roll necks in rolling mills for producing metal sheets and shapes. This, it will be understood, is but one exemplary form of my bearing. Preferably, in the manufacture of my bearings, I arrange the laminae either concentric with the shaft or neck, or at least parallel to the plane of the axis of the shaft or neck, as shown at 3 in Fig. 2, which is a section along the lines 2—2 of Fig. 1. I am enabled to do this because lubricant in my bearing structure is substantially homogeneously distributed, and is not segregated at the surfaces of the laminae. I may also make bearings of other forms, particularly forms in which the shaft or neck contacts the edges of laminae. The bearings may also be manufactured by making solid blocks of my material and machining the surfaces thereof as desired. Again tubular bearings may be made in known ways by rolling saturated materials on a mandrel.

By reason not only of the great fineness of subdivision of my lubricating material, but also by reason of its homogeneous distribution throughout the body of my bearing structure, I am enabled to make bearings and other articles which have far greater tensile strengths than has hitherto been possible with equivalent amounts of lubricant. Instead of being limited, as in current prior art practices, to the use of 5% or less, of flake graphite, I am enabled to use very much larger percentages. In practice in heavy duty bearings, I currently employ up to 10% and more of graphite. Very much larger percentages may be employed where the requirements for tensile strength are not so stringent. There is substantially no tendency in my bearings toward de-lamination.

Modifications may be made in my invention without departing from the spirit thereof.

I claim:

A bearing material consisting of a hardened body of permeable laminae and synthetic resin, with finely divided graphite dispersed throughout said body substantially homogeneously, the said graphite having a fineness of subdivision such that all of it will pass through a screen having at least 325 meshes to the inch, the said bearing material in cross section having a uniformly black appearance excepting where components of the laminae are visible, being free from the usual appearance of graphitic articles and having a high dielectric strength and high insulative property, the quantity of said graphite material being of the order of 10% or more by weight of the said bearing material.

LOUIS T. FREDERICK.